United States Patent
Ko et al.

(10) Patent No.: US 9,699,810 B2
(45) Date of Patent: *Jul. 4, 2017

(54) WIRELESS COMMUNICATIONS DEVICES SUPPORTING WIFI AND LTE COMMUNICATIONS AND METHODS FOR TRANSMISSION CONTROL THEREOF

(71) Applicant: MediaTek Inc., Hsin-Chu (TW)

(72) Inventors: Li-Chun Ko, Taipei (TW); Chia-Hsiang Hsu, Kaohsiung (TW); Ching-Hwa Yu, Tainan (TW); Ho-Chun Chiang, Zhubei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/238,498

(22) Filed: Aug. 16, 2016

(65) Prior Publication Data

US 2016/0360554 A1  Dec. 8, 2016

Related U.S. Application Data

(63) Continuation of application No. 14/159,203, filed on Jan. 20, 2014, now Pat. No. 9,445,431.

(60) Provisional application No. 61/863,699, filed on Aug. 8, 2013.

(51) Int. Cl.
| H04W 4/00 | (2009.01) |
| H04W 74/08 | (2009.01) |
| H04W 74/04 | (2009.01) |
| H04W 72/12 | (2009.01) |
| H04W 74/00 | (2009.01) |
| H04W 88/06 | (2009.01) |
| H04W 84/12 | (2009.01) |
| H04W 84/04 | (2009.01) |

(52) U.S. Cl.
CPC ... *H04W 74/0816* (2013.01); *H04W 72/1215* (2013.01); *H04W 74/004* (2013.01); *H04W 74/04* (2013.01); *H04W 84/042* (2013.01); *H04W 84/12* (2013.01); *H04W 88/06* (2013.01)

(58) Field of Classification Search
CPC . H04W 74/04; H04W 72/1215; H04W 84/12; H04W 88/06
USPC .......................................................... 370/329
See application file for complete search history.

(56) References Cited

U.S. PATENT DOCUMENTS

| 2007/0206551 A1* | 9/2007 | Moorti | H04W 28/06 370/338 |
| 2012/0120944 A1* | 5/2012 | Yang | H04L 7/04 370/350 |

* cited by examiner

*Primary Examiner* — Afshawn Towfighi
(74) *Attorney, Agent, or Firm* — McClure, Qualey & Rodack, LLP

(57) ABSTRACT

A mobile communications device supporting operation on a first wireless technology and a second wireless technology is provided. The device includes a wireless module performing wireless transceiving to and from a first station of a first wireless technology and a second station of a second wireless technology, and a controller module, transmitting a control message prior to the starting of a uplink transmission period of the first wireless technology via the wireless module to occupy the uplink transmission period of the first wireless technology so as to allow transmission of signals of the second wireless technology during the uplink transmission period of the first wireless technology. In operation, the controller module further rearranges the transmission of signals of the second wireless technology to end the transmission of signals of the second wireless technology prior to the starting of a downlink transmission period of the first wireless technology.

19 Claims, 11 Drawing Sheets

WIRELESS COMMUNICATIONS DEVICES SUPPORTING WIFI AND LTE COMMUNICATIONS AND METHODS FOR TRANSMISSION CONTROL THEREOF

CROSS REFERENCE TO RELATED APPLICATIONS

This application is a Continuation of pending U.S. patent application Ser. No. 14/159,203, filed Jan. 20, 2014, which claims the benefit of U.S. Provisional Application No. 61/863,699, filed on Aug. 8, 2013, the entirety of which is incorporated by reference herein.

BACKGROUND OF THE INVENTION

Field of the Invention

The invention generally relates to transmission control in a wireless communications device, and more particularly, to wireless communications devices and methods for transmission control in a wireless communications device associated with different radio access technologies (RATs).

Description of the Related Art

In a typical mobile communications environment, user equipment (UE) may communicate voice and/or data signals with one or more service networks via cellular stations of the service networks. The wireless communications between the UE and the service networks may be in compliance with various radio access technologies (RATs), such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, Universal Mobile Telecommunications System (UMTS) technology, short range wireless technology such as WLAN (e.g., WiFi) technology, Bluetooth technology, and others.

Currently, the UE may have multiple wireless interfaces for different RATs. For example, the UE may have a WiFi interface for performing WiFi communication and a LTE interface for performing LTE communication. In many situations it is necessary to operate two or more wireless interfaces simultaneously. Depending on the operating frequencies of the wireless interfaces, the UE can experience interference due to the simultaneous operation of the wireless interfaces. Specifically, the transmitting signals on one interface results in interference being experienced in the reception of signals on the other interface. For example, for a UE having both a WiFi interface and a LTE interface for simultaneously supporting WiFi and LTE communications, a WiFi station (STA) may not able to receive data from a WiFi access point (AP) during the LTE uplink transmission period due to the LTE uplink interference so that the WiFi data rate may be dropped. Therefore, the interference between these two technologies operating in the same UE creates challenges for the coexistence of the corresponding wireless interfaces of that UE.

BRIEF SUMMARY OF THE INVENTION

Accordingly, embodiments of the invention provide apparatuses and methods for transmission control in a mobile communications device associated with different Radio Access Technologies (RATs). In certain embodiments, a mobile communications device supporting operation on a first wireless technology and a second wireless technology, comprising: a wireless module performing wireless transceiving to and from a first station of a first wireless technology and a second station of a second wireless technology; and a controller module, transmitting a control message prior to the starting of a uplink transmission period of the first wireless technology via the wireless module to occupy the uplink transmission period of the first wireless technology so as to allow transmission of signals of the second wireless technology during the uplink transmission period of the first wireless technology. The controller module further rearranges the transmission of signals of the second wireless technology to end the transmission of signals of the second wireless technology prior to the starting of a downlink transmission period of the first wireless technology.

In another embodiment, a method for transmission control in a mobile communications device supporting operation on a first wireless technology and a second wireless technology is provided. The method comprising transmitting a control signal prior to the starting of an uplink transmission period of the first wireless technology to occupy the uplink transmission period of the first wireless technology, and allowing the transmission of signals of the second wireless technology to be performed during the occupied uplink transmission period of the first wireless technology, Other aspects and features of the present invention will become apparent to those with ordinarily skill in the art upon review of the following descriptions of specific embodiments of apparatuses and methods for transmission control in a wireless communications system supporting WiFi and LTE communications.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The 3GPP specifications are used to teach the spirit of the invention, and the invention is not limited thereto.

Apparatuses and methods for transmission control in a mobile communications device associated with different Radio Access Technologies (RATs) are provided.

Figure 1:
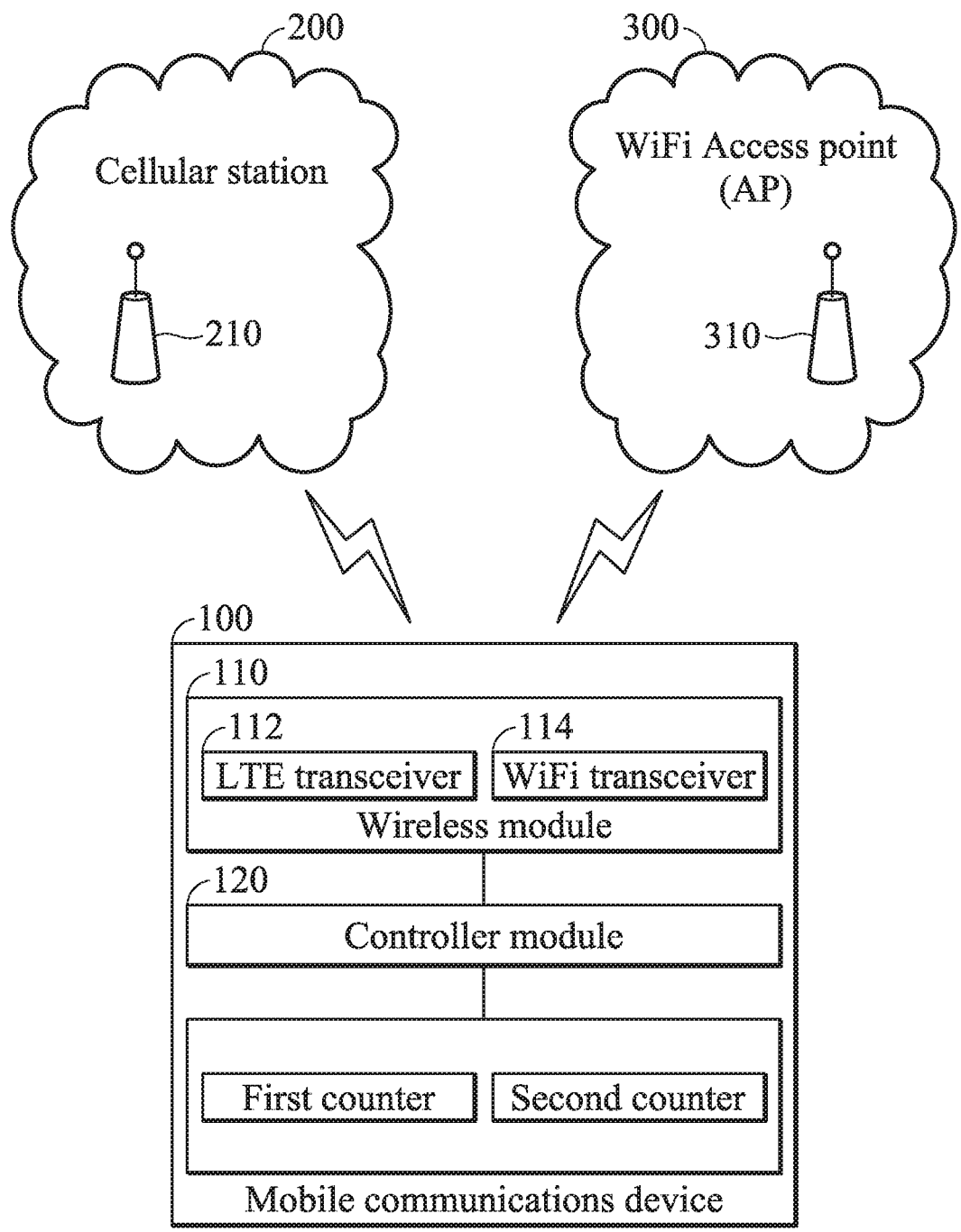
FIG. 1 is a block diagram illustrating a mobile communications environment according to an embodiment of the invention.

FIG. 1 is a block diagram illustrating a mobile communications environment according to an embodiment of the invention. In the mobile communications environment 10, the mobile communications device 100 is wirelessly connected to a first base station 210 of the service network 200 of a first wireless technology and a second base station 310 of the service network 300 of a second wireless technology for obtaining wireless services. The first wireless technology can be a cellular technology such as LTE or UMTS. The second wireless technology can be a WiFi technology such as IEEE 802.11 or a personal area network technology such as Bluetooth. Generally, the base station 210 may be referred to as a base station, a cell or an access station, or may be referred to as an Home Node-B (HNB) in a WCDMA network or a Home e-Node-B (HeNB) in an LTE network, which is controlled by a control node (not shown) to provide the functionality of wireless transceiving for the service network 200 (e.g. the LTE network). Similarly, the base station 310 may be referred to as a base station, a cell or an access station, or may be referred to as an access point (AP) in a WLAN network, to provide the functionality of wireless transceiving for the service network 300 (e.g. the WiFi network).

In this embodiment, the base station 210 is an LTE cellular station (or called an LTE cell) which supports the LTE technology and the base station 310 is a WiFi AP which supports the WiFi technology. The mobile communications device 100 is referred to as a user equipment (UE) or a mobile station (MS), supporting the abovementioned RATs, and can be a device such as a mobile phone, a computer system, etc. The mobile communications device 100 comprises a wireless module 110 for performing the functionality of wireless transmissions and receptions to and from the LTE cellular station 210 or the WiFi AP 310. The methods can be used in wireless communication systems with one or more mobile communications devices 100, wherein the mobile communications devices may comprise a first transceiver for the first wireless technology and a second transceiver for the second wireless technology. For example, in this embodiment, the first transceiver can be a LTE transceiver 112 and the second transceiver can be a WiFi transceiver 114 which are configured to provide WiFi AP functionality or configured to function as WiFi Stations (STA), but the invention is not limited thereto.

To further clarify, the wireless module 110 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 900 MHz, 1900 MHz, or 2100 MHz utilized in WCDMA systems, or may be 900 MHz, 2100 MHz, or 2.6 GHz utilized in LTE systems, or others depending on the radio access technology (RAT) in use.

Also, the mobile communications device 100 further comprises a controller module 120 for controlling the operation of the wireless module 110 and other functional components, such as a display unit and/or keypad serving as the MMI (man-machine interface), a storage unit storing the program codes of applications or communication protocols, or others. In one embodiment, the mobile communications device 100 may be a UE in compliance with both of the specifications of the WiFi and LTE communication protocols, and the invention is not limited thereto.

To be more specific, the controller module 120 controls the wireless module 110 for performing a data transmission operation with the service network 200 and/or the service network 300 via the LTE cellular station 210 and/or the WiFi AP 310, respectively. The controller module 120 may perform a uplink transmission for the LTE communication to transmit data to the LTE cellular station 210 during a uplink transmission period of the LTE communication or a downlink transmission for the LTE communication to receive data from the LTE cellular station 210 during a downlink transmission period of the LTE communication via the LTE transceiver 112 of the wireless module 110. The controller module 120 may also perform a WiFi transmission to transmit signals or data packets to a receiving end (e.g. the WiFi AP 310 or other WiFi STAs) in the service network 300 via the WiFi transceiver 114 of the wireless module 110 and then should receive a replied acknowledge (ACK) packet/message from the receiving end after the signals or data packets have been transmitted. The controller module 120 may also perform a WiFi reception to receive signals or data packets from a transmission end (e.g. the WiFi AP 310 or other WiFi STAs) in the service network 300 via the WiFi transceiver 114 and then should reply an ACK packet/message to the transmission end after the signals or data packets have been received.

Figure 2:
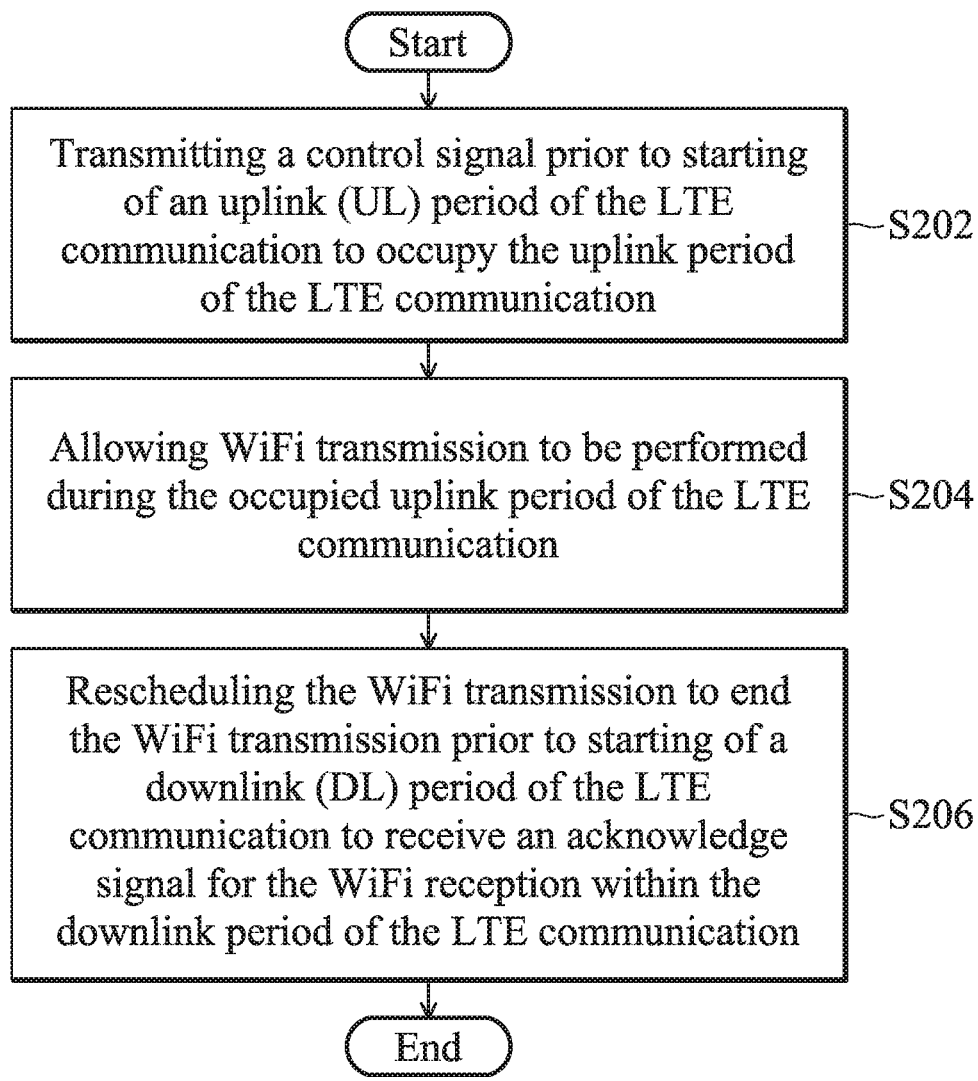
FIG. 2 is a flow chart illustrating a method for transmission control in a mobile communications device according to an embodiment of the invention.

FIG. 2 is a flow chart illustrating a method for transmission control in a mobile communications device according to an embodiment of the invention. In this embodiment, the mobile communications device is camped on a first cellular station of the first service network and is also capable of camping on a second cellular station of a second service network, wherein the first service network supports the LTE technology and the second service network supports the WiFi technology. To begin, the controller module 120 transmits a control signal prior to the starting of an uplink (UL) transmission period of the LTE communication to occupy the UL period of the LTE communication (step S202). For example, in one embodiment, the controller module 120 may send a Clear-To-Send-to-self (CTS2Self) control signal before the start point of the LTE UL period to reserve the medium to occupy the UL period of the LTE communication for WiFi data transmission via the WiFi transceiver 114 of the wireless module 110.

Figure 3:
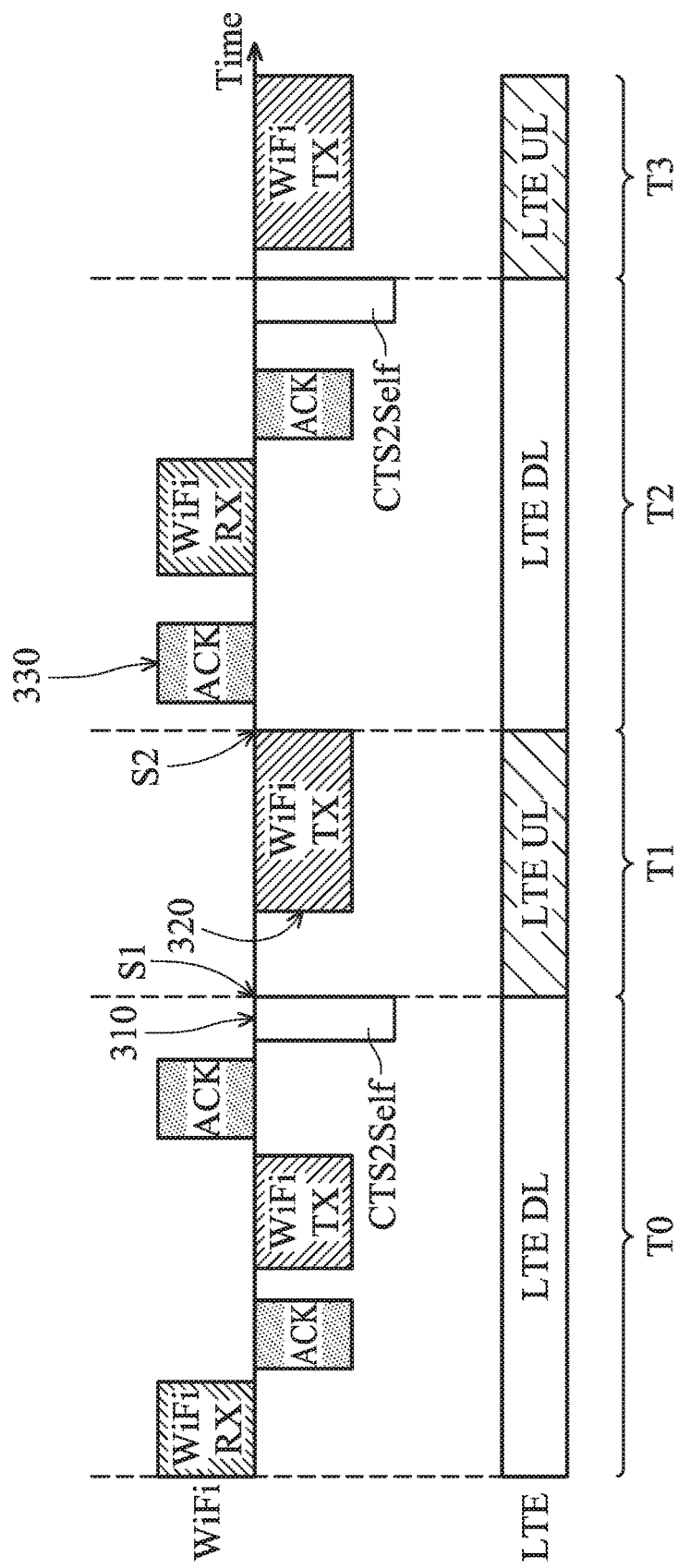
FIG. 3 is a timing diagram illustrating timing for transmission control in a mobile communications device supporting the WiFi communication and the LTE communication according to an embodiment of the invention.

After the UL period of the LTE communication has been occupied, the controller module 120 allows the WiFi transmission to be performed during the occupied UL period of the LTE communication (step S204). If there is any WiFi data requiring to be transmitted, the WiFi transmission can be performed during the occupied UL period of the LTE communication. When the WiFi transmission is to be performed, the WiFi transmission is further rescheduled by the controller module 120 to end the WiFi transmission prior to the starting of a downlink (DL) transmission period of the LTE communication so as to receive an ACK signal for the WiFi reception within the DL period of the LTE communication (step S206). As the control signal CTS2Self is sent before the start point of the UL period of the LTE communication to protect WiFi channel and the ACK signal for the WiFi reception is received in the DL transmission period of the LTE communication rather than the UL transmission period of the LTE communication, the data rate for the WiFi AP will not be dropped. For example, the controller module 120 can set a network allocation vector (NAV) parameter in the CTS2Self message to indicate the time interval for which the WiFi communications should not be initiated and send the CTS2Self message to other WiFi devices via the WiFi transceiver 114. Other WiFi devices that receive the CTS2SELF message from the mobile communications device 100 do not initiate WiFi communications. This can free the communication medium from WiFi communications, thus preventing interference between LTE communications and WiFi communications during the LTE allocated communication time interval For example, please refer to FIG. 3, which is a timing diagram illustrating timing for transmission control in a mobile communications device supporting the WiFi communication and the LTE communication according to an embodiment of the invention. As shown in FIG. 3, time durations T0 to T3 are illustrated, wherein the time durations T0 and T2 represent the DL periods of the LTE communication (hereinafter also referred to as the LTE DL period) while the time durations T1 and T3 represent the UL periods of the LTE communication (hereinafter also referred to as the LTE UL period). During the LTE DL period T0, the WiFi transceiver 114 is free to perform the WiFi transmission or WiFi reception of WiFi signals/packets. To avoid interference from the transmission of the LTE UL period to the WiFi transmission, a control signal CTS2Self is transmitted prior to starting (e.g. at the start time point S1) of the LTE UL period T1, as shown in 310. By transmitting the control signal CTS2Self, the LTE UL period T1 can be occupied for data transmission by the WiFi transceiver. Therefore, during the time duration T1 of the LTE UL period, if there is any data waiting to be transmitted, the WiFi transceiver can transmit the WiFi packets (WiFi TX), as shown in 320. To be more specific, in some embodiments, the WiFi transceiver can be operated in a specific mode, a WiFi TX alignment mode, during which the WiFi transceiver can transmit the WiFi packets to the WiFi AP. Then, the WiFi transceiver further reschedules the WiFi transmission to end the WiFi transmission before or at the starting (e.g. the start time point S2) of the LTE DL period T2 of the LTE communication so as to receive an acknowledge signal ACK for the WiFi reception within the LTE DL period T2, as shown in 330. Because the WiFi transmission is rescheduled to be ended before the starting (e.g. the start time point S2) of the LTE DL period, the acknowledge signal ACK for the WiFi reception can be received within the subsequent LTE DL period T2. Similarly, by transmitting the control signal CTS2Self before the start of the LTE UL period T3, the LTE UL period T3 can be occupied for data transmission by the WiFi transceiver again. During the time duration T3 of the LTE UL period, if there is any WiFi data waiting to be transmitted, the WiFi transceiver can transmit the WiFi packets. To be more specific, in some embodiments, the WiFi transceiver can be operated in the specific mode, i.e. the WiFi TX alignment mode, to transmit the WiFi packets to the WiFi AP.

Figure 4:
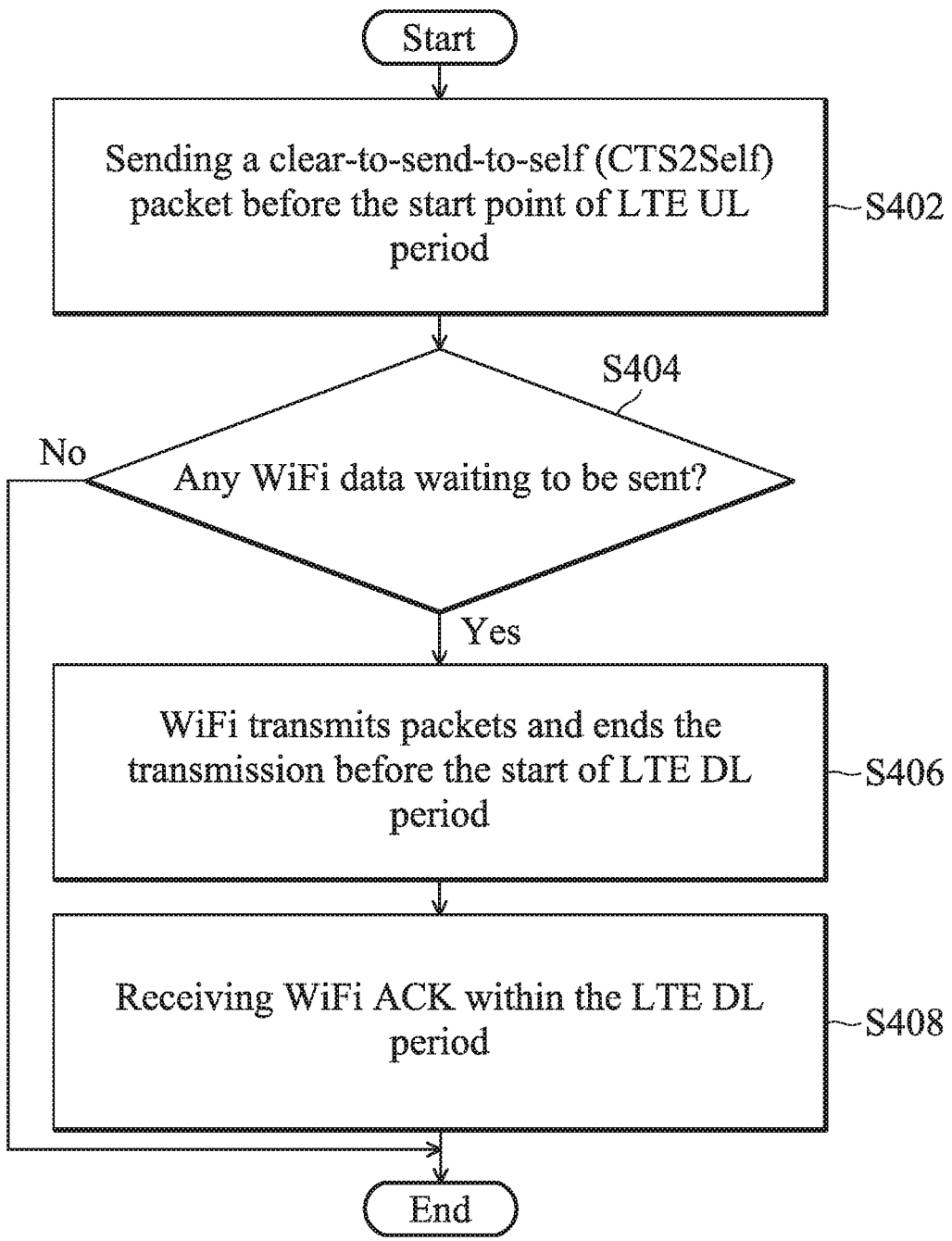
FIG. 4 is a flow chart illustrating a method for transmission control in a mobile communications device according to another embodiment of the invention.

FIG. 4 is a flow chart illustrating a method for transmission control in a mobile communications device according to another embodiment of the invention. In this embodiment, the mobile communications device is camped on a first cellular station of the first service network and is also capable of camping on a second cellular station of a second service network, wherein the first service network supports the long term evolution (LTE) technology and the second service network supports the WiFi technology. To begin, the mobile communications device sends a clear-to-send-to-self (CTS2Self) packet before the start point of LTE UL period (step S402) to occupy the LTE UL period of the LTE communication. After the CTS2Self packet has been sent, the mobile communications device further determines whether any WiFi data waits to be sent during the LTE UL period (step S404). If no WiFi data waits to be sent during the LTE UL period (No in step S404), the flow ends. If at least one WiFi data waits to be sent during the LTE UL period (Yes in step S404), the WiFi transceiver transmits packets and ends the transmission before the start of LTE DL period (step S406). Then, the mobile communications device receives a WiFi ACK for the WiFi reception within the LTE DL period (step S408).

In some embodiments, the controller module 120 may reschedule the WiFi transmission to end the WiFi transmission before or at the starting of the LTE DL period by adjusting a packet start time or a transmission data rate for the WiFi transmission according to a packet length of the packet being transmitted. In one embodiment, the waiting time or so-called the back-off time is adjusted if the transmission rate is determined. In another embodiment, the transmission rate is adjusted to extend the packet transmission time if the back-off time is determined.

Referring to FIG. 1, a first counter RW_orig and a second counter RW_TX_align are provided, wherein the first counter RW_orig is arranged for counting a time for transmission of signals of the second wireless technology during the downlink transmission period of the first wireless technology and a second counter for counting a time for transmission of signals of the second wireless technology during the uplink transmission period of the first wireless technology, and the transmission of signals of the second wireless technology can be performed during either the downlink transmission period or the uplink transmission period of the first wireless technology based on counter values of the first and second counters. To be more specific, the transmission of signals of the second wireless technology can be performed during the downlink transmission period of the first wireless technology based on the counter value of the first counter, wherein the second transceiver is free to transmit or receive signals or data during this period. The transmission of signals of the second wireless technology can also be performed during the uplink transmission period of the first wireless technology based on the counter value of the second counter, wherein the second transceiver can only transmit signals or data or do nothing during this period.

Figure 5:
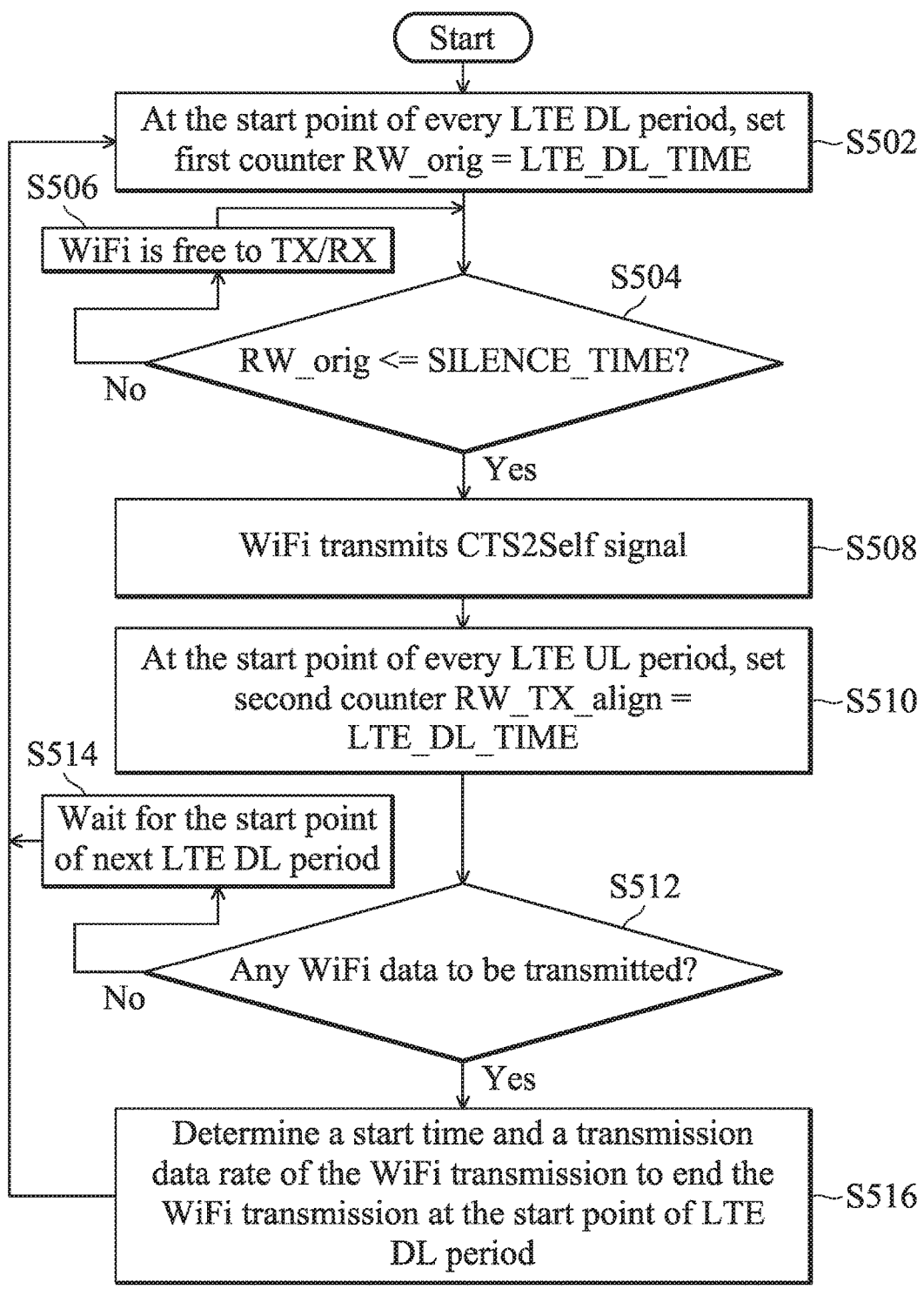
FIG. 5 is a flow chart illustrating a method for transmission control in a mobile communications device according to another embodiment of the invention.

FIG. 5 is a flow chart illustrating a method for transmission control in a mobile communications device according to another embodiment of the invention.

Figure 6:
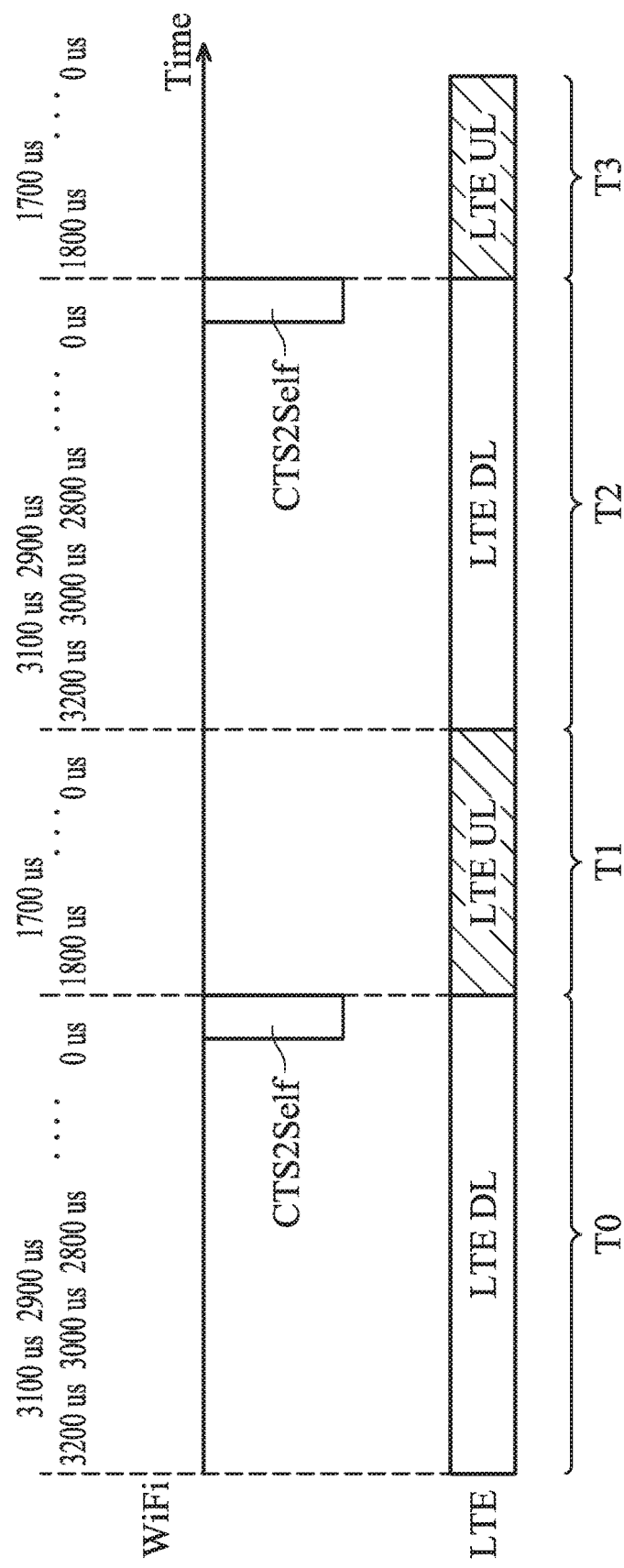
FIG. 6 is a schematic diagram illustrating an example of counter usage according to an embodiment of the invention.

In step S502, at the start point of every LTE DL period, the controller module 120 sets the first counter RW_orig to be a value equal to LTE_DL_TIME, wherein the value LTE_DL_TIME indicates a time length for the LTE_DL_period. For example, if the value LTE_DL_TIME is set to be 3200 us and the value LTE_UL_TIME is set to be 1800 us, the first counter RW_orig is counting down from 3200 us to zero with time during the LTE DL period while the second counter RW_TX_align is counting down from 1800 us to zero with time during the LTE UL period, as shown in FIG. 6.

In step S504, the controller module 120 further determines whether the counter value of the first counter RW_orig is less than or equal to a predefined value SILENCE_TIME.

If the counter value of the first counter RW_orig is greater than the value SILENCE_TIME (No in step S504), Wi-Fi transceiver controlled by the controller module 120 is free to perform WiFi transmission/reception (step S506).

If the counter value of the first counter RW_orig is less than or equal to the value SILENCE_TIME (Yes in step S504), Wi-Fi transceiver transmits a control signal clear-to-send-to-self (CTS2Self) to the WiFi AP or other WiFi devices to occupy the LTE UL period (step S508).

Next, at the start point of every LTE DL period, the controller module 120 sets the second counter RW_TX_align to be a value equal to LTE_UL_TIME, wherein the value LTE_UL_TIME indicates a total time length for the LTE UL period (step S510).

During each LTE UL period, the controller module 120 then determines whether the Wi-Fi transceiver requests to perform a WiFi transmission to transmit WiFi data (step S512).

If the Wi-Fi transceiver does not request to transmit WiFi data (No in step S512), the controller module 120 waits for the start point of next LTE DL period (step S514) and return to S502 to reset the first counter RW_orig to be the value equal to LTE_DL_TIME.

If the Wi-Fi transceiver requests to transmit WiFi data (Yes in step S512), the controller module 120 further determines a starting time of the WiFi transmission and a data transmission rate for the WiFi transmission according to a packet length of the WiFi packet to be sent to make sure the Wi-Fi transmission ends at the start point of the LTE DL period (step S516). Thus, the controller module 120 can then receive a replied ACK packet/message from the receiving end after the WiFi transmission has been finished within the LTE DL period and then performs the WiFi reception as well during the LTE DL period.

Several embodiments are further provided to make sure response-ACK to activate the WiFi reception falls in LTE DL period. FIGS. 7A to 7E are timing diagrams illustrating timing for transmission control in a mobile communications device supporting the WiFi communication and the LTE communication according to embodiments of the invention.

Figure 7A:
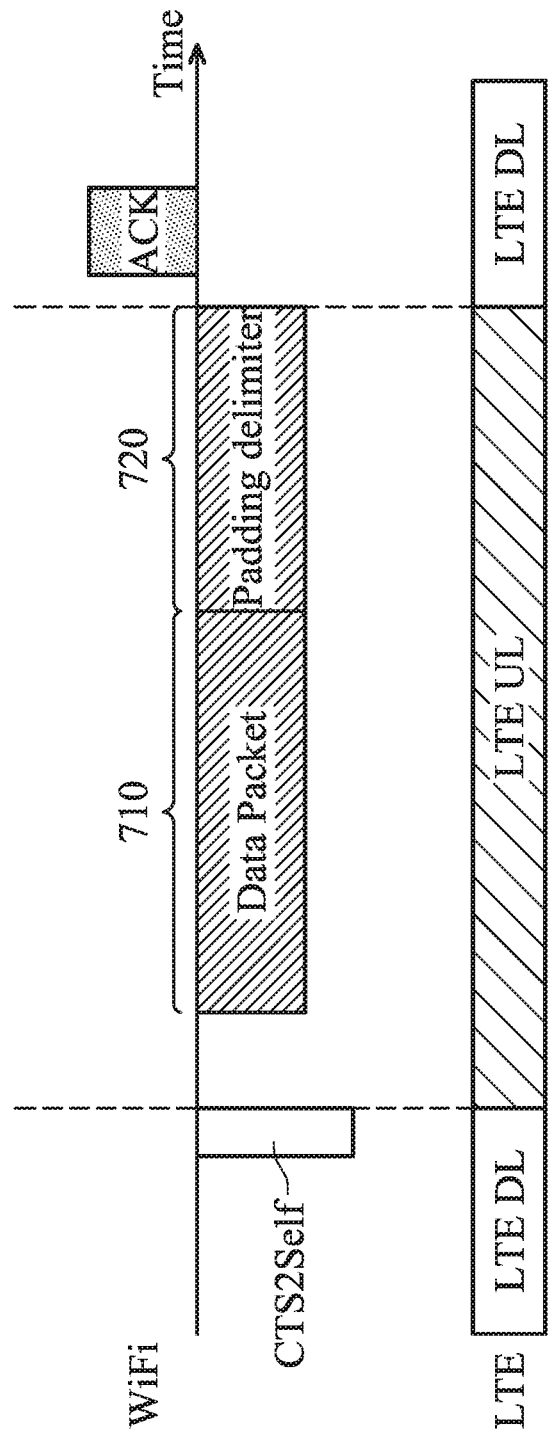
FIGS. 7A to 7E are timing diagrams illustrating timing for transmission control in a mobile communications device supporting the WiFi communication and the LTE communication according to embodiments of the invention.

In the first embodiment shown in FIG. 7A, the controller module 120 may reschedule the WiFi transmission to end the WiFi transmission before or at the starting of the LTE DL period by using "padding delimiter" to extend the packet transmission time so as to make sure ACK falls in LTE DL period. For example, in this embodiment, it is appended NULL delimiter 720 to extend the packet transmission time if the data packet 710 being transmitted cannot end on the start of the LTE DL period.

Figure 7B:
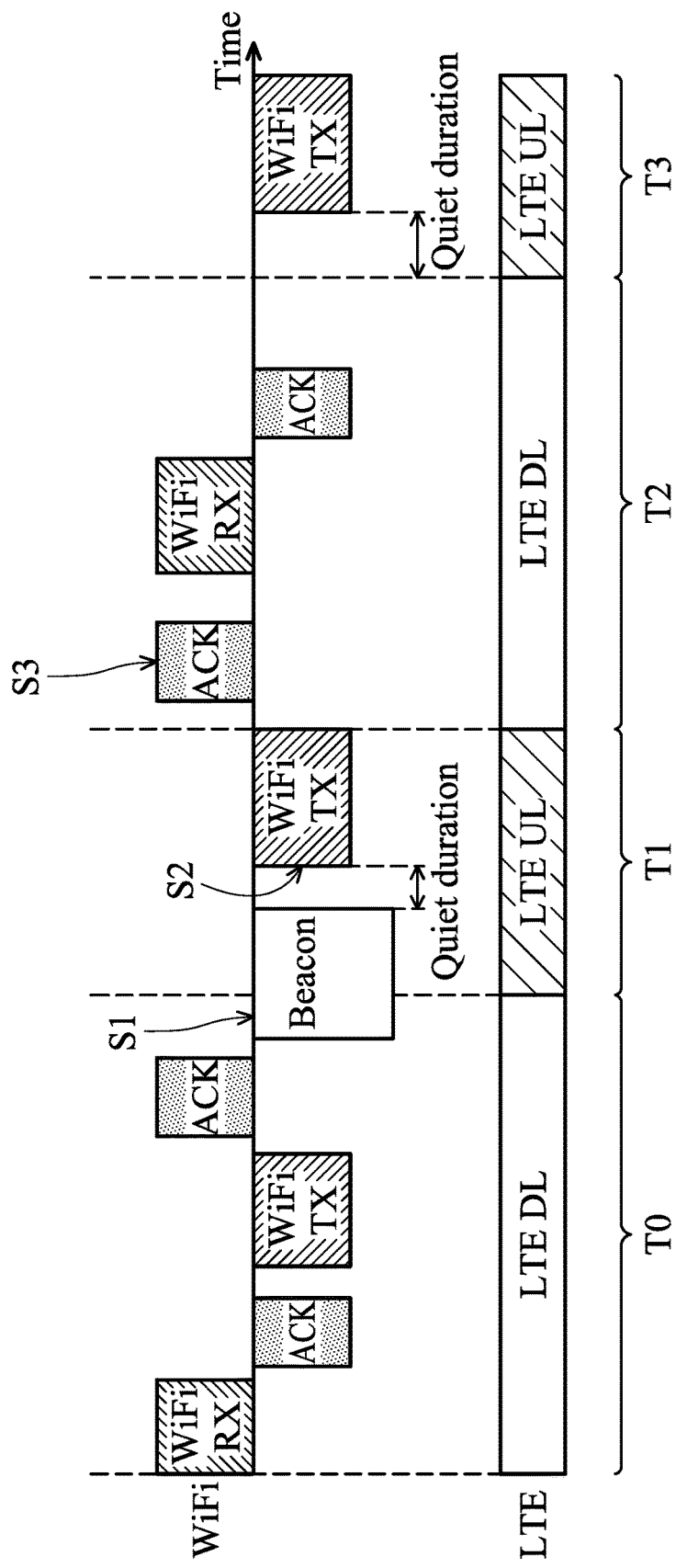

In the second embodiment shown in FIG. 7B, the controller module 120 may reschedule the WiFi transmission to end the WiFi transmission before or at the starting of the LTE DL period by configuring a Quiet duration with a duration data for reserving the deferred starting time for further transmission to make sure ACK falls in LTE DL period. The Quiet element defines an interval during which no transmission shall occur in the current channel. In this embodiment, in step S1, Beacon is sending with Quiet duration reserving the deferred starting time for future transmissions during the LTE DL period T0. In step S2, during the LTE UL period T1, if there is any data waiting to be sent, the controller module 120 transmits packets and ends the transmissions before the start of the LTE DL period via the WiFi transceiver 114 of the wireless module 110. In step S3, ACK to activate the WiFi reception can be received by the controller module 120 within LTE DL period T2.

Figure 7C:
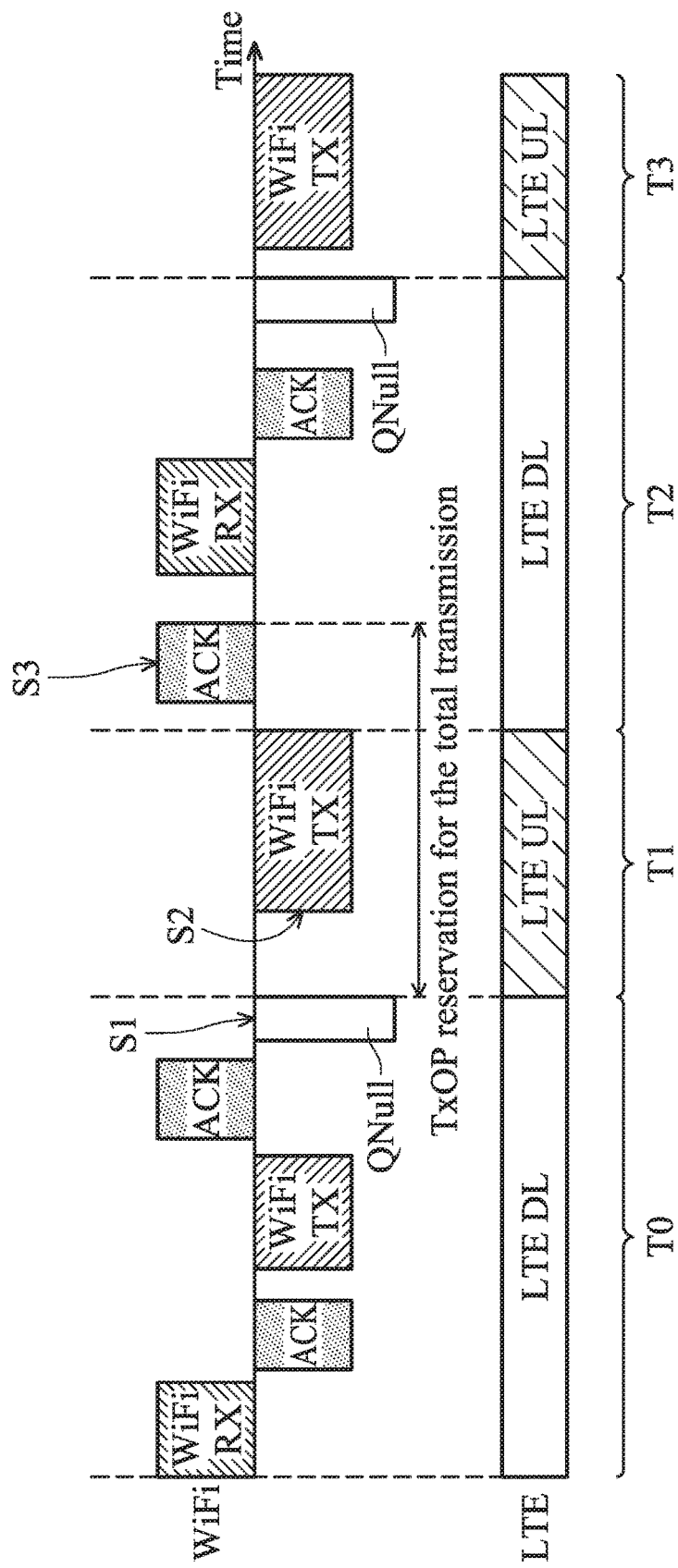

In the third embodiment shown in FIG. 7C, the controller module 120 may reschedule the WiFi transmission to end the WiFi transmission before or at the starting of the LTE DL period by sending a TxOP reservation message to make sure ACK falls in LTE DL period. In this embodiment, in step S1, A TxOP holder sending QoS Null packet with a duration field (no ACK) with its duration longer than specified the total time for the next transmission before the start of LTE UL period T1. In step S2, during the LTE UL period T1, if there is any data waiting to be sent, the controller module 120 transmits packets and ends the transmissions before the start of the LTE DL period via the WiFi transceiver 114 of the wireless module 110. In step S3, WiFi ACK RX can be received by the controller module 120 within LTE DL period T2.

Figure 7D:
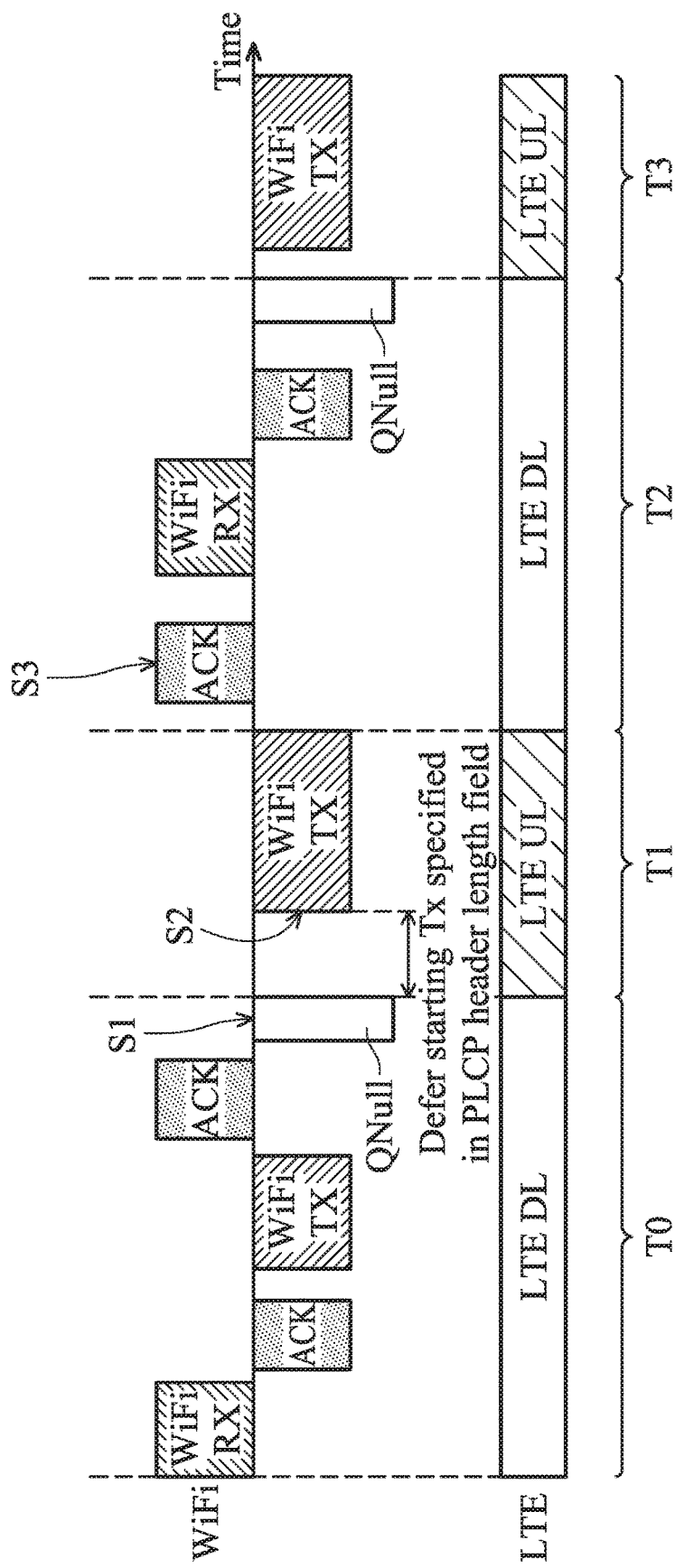

In the fourth embodiment shown in FIG. 7D, the control module 120 transceiver may reschedule the WiFi transmission to end the WiFi transmission before or at the starting of the LTE DL period by sending a physical layer control message, e.g. a physical layer convergence protocol (PLCP) header length, to make sure ACK falls in LTE DL period. A length field include in the complementary code keying (CCK) PLCP header indicates the time duration to be occupied by the packet. Any WiFi device which supports the WiFi transmission receives a valid CCK PLCP header will keep in receiving mode/silence until the specified time (length) expired. Therefore, the CCK PLCP header can be utilize to keep other Wi-Fi devices quiet, reserving time for other co-located radio systems, or deferring starting time for the next transmission. In this embodiment, in step S1, A CCK QoS Null packet with a duration field (no ACK) with its PLCP header length field specified the deferred starting time for the next transmission is transmitted before the start of LTE UL period T1. In step S2, during the LTE UL period T1, if there is any data waiting to be sent, the controller module 120 transmits packets and ends the transmissions before the start of the LTE DL period via the WiFi transceiver 114 of the wireless module 110. In step S3, WiFi ACK RX can be received by the controller module 120 within LTE DL period T2.

Figure 7E:
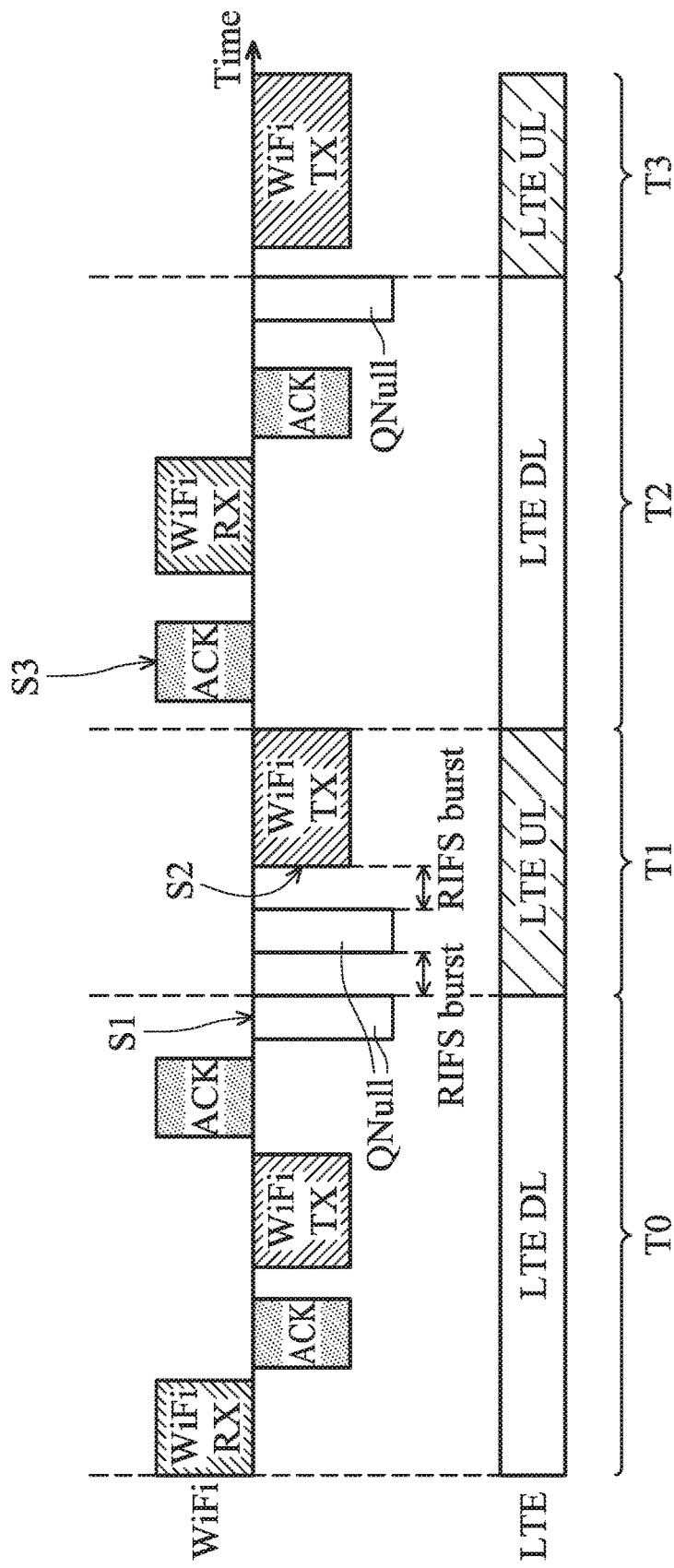

In the fifth embodiment shown in FIG. 7E, the controller module 120 may reschedule the WiFi transmission to end the WiFi transmission before or at the starting of the LTE DL period by using a Reduced-InterFrame Space (RIFS) protection message to make sure ACK falls in LTE DL period. In this embodiment, in step S1, QoS Null packets (no ACK) are sent with RIFS burst until the deferred starting time for the next transmissions before the start of LTE UL period T1. In step S2, during the LTE UL period T1, if there is any data waiting to be sent, the controller module 120 transmits packets and ends the transmissions before the start of the LTE DL period T2 via the WiFi transceiver 114 of the wireless module 110. In step S3, WiFi ACK RX can be received by the controller module 120 within LTE DL period T2.

Therefore, according to the mobile communications devices supporting WiFi communication and LTE communication and related methods for transmission control of the invention, by applying WiFi transmission alignment control which transmits a control message prior to the starting of a uplink transmission period of the LTE communication to occupy the uplink transmission period of the LTE communication and rearranges the WiFi transmission to end it prior to the starting of the downlink transmission period of the LTE communication, the WiFi transmission can be performed during the uplink transmission period of the LTE communication and the ACK for the WiFi reception can be received only within the downlink transmission period of the LTE communication so that WiFi transmission throughput can be maximized with simultaneous LTE traffic, thereby minimizing WiFi transmission performance degradation and providing more WiFi reception opportunities.

The method for transmission control may be implemented in program code stored in a machine-readable storage medium, such as a magnetic tape, semiconductor, magnetic disk, optical disc (e.g., CD-ROM, DVD-ROM, etc.), or others, and when loaded and executed by a processing unit, a micro-control unit (MCU), or the controller module 120 in FIG. 1, the program code may perform the method for transmission control in a mobile communications device supporting WiFi communication and LTE communication. In addition, the method may be applied to any mobile communications device supporting the WiFi technology and/or the LTE technology.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A mobile communications device supporting operation on a first wireless technology and a second wireless technology, comprising:
a wireless module performing wireless transceiving to and from a first station of a first wireless technology and a second station of a second wireless technology; and
a controller module, transmitting a control message prior to the starting of a uplink transmission period of the first wireless technology via the wireless module to occupy the uplink transmission period of the first wireless technology so as to allow transmission of signals of the second wireless technology during the uplink transmission period of the first wireless technology,
wherein the controller module further rearranges the transmission of signals of the second wireless technology to end the transmission of signals of the second wireless technology prior to the starting of a downlink transmission period of the first wireless technology by adjusting a packet start time or a transmission data rate for the transmission of signals of the second wireless technology according to a packet length of the signals of the second wireless technology.

2. The mobile communications device of claim 1, wherein the controller module further rearranges the transmission of signals of the second wireless technology to end the transmission of signals of the second wireless technology prior to the starting of the downlink transmission period of the first wireless technology by extending a packet transmission time for the transmission of signals of the second wireless technology using padding delimiters.

3. The mobile communications device of claim 1, wherein the controller module further rearranges the transmission of signals of the second wireless technology to end the transmission of signals of the second wireless technology prior to the starting of the downlink transmission period of the first wireless technology by configuring a Quiet duration with a duration data for reserving the deferred starting time for further transmission.

4. The mobile communications device of claim 1, wherein the controller module further rearranges the transmission of signals of the second wireless technology to end the transmission of signals of the second wireless technology prior to the starting of the downlink transmission period of the first wireless technology by sending a TxOP reservation message.

5. The mobile communications device of claim 1, wherein the controller module further rearranges the transmission of signals of the second wireless technology to end the transmission of signals of the second wireless technology prior to the starting of the downlink transmission period of the first wireless technology by sending a Reduced-InterFrame Space (RIFS) protection message.

6. The mobile communications device of claim 1, wherein the controller module further rearranges the transmission of signals of the second wireless technology to end the transmission of signals of the second wireless technology prior to the starting of the downlink transmission period of the first wireless technology by sending a physical layer control message.

7. The mobile communications device of claim 1, wherein the control message is a clear-to-send-to-self (CTS2SELF) control message.

8. The mobile communications device of claim 7, wherein the control message is sent within a predetermined slice time before the starting of the downlink transmission period of the first wireless technology.

9. The mobile communications device of claim 1, wherein the first wireless technology is a long term evolution (LTE) technology and the second wireless technology is a WiFi technology.

10. A mobile communications device supporting operation on a first wireless technology and a second wireless technology, comprising:
a wireless module performing wireless transceiving to and from a first station of a first wireless technology and a second station of a second wireless technology; and
a controller module, transmitting a control message prior to the starting of a uplink transmission period of the first wireless technology via the wireless module to occupy the uplink transmission period of the first wireless technology so as to allow transmission of signals of the second wireless technology during the uplink transmission period of the first wireless technology
wherein the controller module further rearranges the transmission of signals of the second wireless technology to end the transmission of signals of the second wireless technology prior to the starting of a downlink transmission period of the first wireless technology, further comprising a first counter for counting a time for the transmission of signals of the second wireless technology during the downlink transmission period of the first wireless technology and a second counter for counting a time for the transmission of signals of the second wireless technology during the uplink transmission period of the first wireless technology, and the transmission of signals of the second wireless technology is performed during the downlink transmission period or the uplink transmission period of the first wireless technology based on counter values of the first and second counters.

11. A method for transmission control in a mobile communications device supporting operation on a first wireless technology and a second wireless technology, the method comprising:

transmitting a control signal prior to the starting of an uplink transmission period of the first wireless technology to occupy the uplink transmission period of the first wireless technology; and allowing the transmission of signals of the second wireless technology to be performed during the occupied uplink transmission period of the first wireless technology, wherein the method further comprises rearranging the transmission of signals of the second wireless technology to end the transmission of signals of the second wireless technology prior to the starting of a downlink transmission period of the first wireless technology by adjusting a packet start time or a transmission data rate for the transmission of signals of the second wireless technology according to a packet length of the signals of the second wireless technology.

12. The method of claim 11, wherein the first wireless technology is a long term evolution (LTE) technology and the second wireless technology is a WiFi technology.

13. The method of claim 12, wherein the rearranging step is performed by adjusting a packet start time or a transmission data rate for the WiFi transmission.

14. The method of claim 12, wherein the rearranging step is performed by extending a packet transmission time for the WiFi transmission using padding delimiters.

15. The method of claim 12, wherein the rearranging step is performed by configuring a Quiet duration with a duration data for reserving the deferred starting time for further transmission.

16. The method of claim 12, wherein the rearranging step is performed by sending a TxOP reservation message.

17. The method of claim 12, wherein the rearranging step is performed by sending a sending a Reduced-InterFrame Space (RIFS) protection message.

18. The method of claim 12, wherein the rearranging step is performed by sending a physical layer control message.

19. The method of claim 11, wherein the control message is a clear-to-send-to-self (CTS2SELF) control message.

\* \* \* \* \*